United States Patent Office 2,912,440
Patented Nov. 10, 1959

2,912,440

3,3'-IMINO- AND 3,3'-SUBSTITUTED IMINODIPHTHALIDES

Donald D. Wheeler and David C. Young, Midland, Mich., assignors to The Dow Chemical Company, Midland, Mich., a corporation of Delaware No Drawing. Application August 6, 1958
Serial No. 753,433

6 Claims. (Cl. 260—343.3)

This invention is concerned with diphthalides having the structure

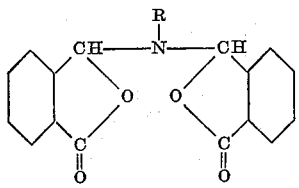

In this and succeeding formulae R represents a member of the group consisting of hydrogen, halo-lower-alkyl, lower-alkoxy-lower-alkyl, phenyl-lower-alkyl, cycloalkyl containing from 5 to 6 carbon atoms, inclusive, alkyl containing from 1 to 18 carbon atoms, inclusive, and alkenyl containing from 3 to 18 carbon atoms, inclusive. The expressions "lower-alkoxy" and "lower-alkyl" refer to radicals containing from 1 to 4 carbon atoms, inclusive. Representative halo-lower-alkyl radicals include 2-chloroethyl, 3-bromopropyl and 4-chlorobutyl. Representative lower-alkoxy-lower-alkyl radicals include, 2-butoxyethyl, 3-methoxypropyl, 4-ethoxybutyl and 2-ethoxyisopropyl. Representative phenyl-lower-alkyl radicals include 2-phenylethyl, benzyl and 3-phenylpropyl. Representative cycloalkyl radicals include cyclohexyl and cyclopentyl. Representative alkyl radicals include normal-propyl, iso-propyl, ethyl, decyl, octyl, hexadecyl and octadecyl. Representative alkenyl radicals include allyl, 1-methyl-4-pentenyl and oleyl.

The new compounds are amber or colorless liquids or light colored solids. They are somewhat soluble in common organic solvents such as benzene, acetone and ethanol, and substantially insoluble in water. These compounds are useful as parasiticides and are adapted to be employed for the control of bacteria, nematodes and insects.

The above compounds may be prepared by causing phthalaldehydic acid to react with ammonia or a primary amine having the formula, RNH₂, to produce the desired pthalide and water of reaction. The terms "phthalaldehydic acid" and "3-hydroxyphthalide" refer to a compound having the structure

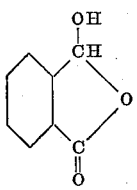

Phthalaldehydic acid is often represented in the literature as having the structure

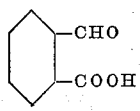

However, the acid employed in this invention and prepared as hereinafter described exists almost entirely in the 3-hydroxy-phthalide ring structure, as indicated by its infrared absorption spectrum. Infrared data also indicate the phthalide products to have the ring structure.

In the synthesis of the new compounds, good results are obtained when two molar proportions of phthalaldehydic acid and one molar proportion of amine are employed, however, the product may be obtained when equimolar proportions of the reactants are employed. The reaction is preferably carried out in an inert solvent as reaction medium. Suitable solvents include acetone, benzene, butanone and water. The reaction is carried out in the temperature range of from 20° to 110° C., employing a lower temperature range of from 20° to 70° C. during the initial stages of the reaction.

In carrying out the reaction, phthalaldehydic acid and an appropriate amine or ammonia are dissolved in or mixed with a reaction solvent. Mixing of the reactants and solvent results in the development of a heat of reaction and cooling is oftentimes employed to maintain temperature control. The resulting mixture is then heated for a period of from a few minutes to four hours to produce the desired phthalide product and water of reaction. The product frequently precipitates in the reaction mixture during the heating period. After completion of the heating, the mixture is allowed to cool to precipitate further product. The latter may be separated from the mixture by conventional methods such as filtration, if the product is a solid, or by extraction and/or by distillation of the solvent, if the product is a liquid.

In an alternative method, the reaction is carried out in a solvent such as benzene which is capable of forming azeotropic mixtures with water. In such method, the water of reaction and the solvent is distilled out of the reaction zone during the heating step and the product obtained as a residue. The pressure may be gradually reduced to facilitate the removal of the solvent and the water. The product may then be purified by conventional methods.

The following examples illustrate the invention but are not to be construed as limiting.

*Example 1.—3,3'-(N-normal-butylimino)diphthalide*

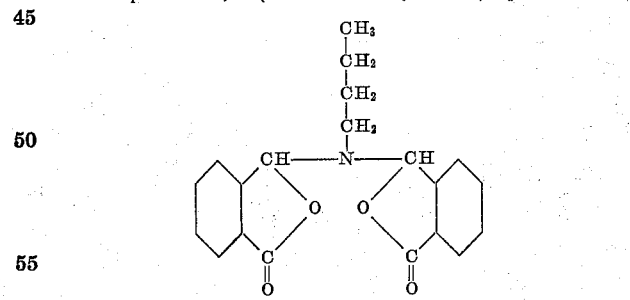

75.0 grams (0.50 mole) of phthalaldehydic acid was added to a solution of 18.2 grams (0.25 mole) of normal-butylamine in 200 milliliters of benzene. Reaction took place with evolution of heat and cooling was employed during the addition to maintain temperature control. After completion of the addition, the mixture was heated on the steam bath for 45 minutes. During the heating, the solution became cloudy with the separation of the water of reaction and the water-benzene mixture distilled as an azetrope when the solution temperature reached about 70° C. After completion of the heating, the mixture was cooled in an ice bath to precipitate a white solid. The latter was recovered by filtration, washed, dried and recrystallized from benzene to obtain a 3,3'-(N-normal-butylimino)diphthalide product melting at 132°–133° C.

The yield of the product amounted to 47 grams or 56 percent of theoretical.

*Example 2.—3,3'-(N-benzylimino)diphthalide*

75.0 grams (0.50 mole) of phthalaldehydic acid was added to a solution of 25.5 grams (0.24 mole) of benzylamine in 200 milliliters of benzene. Cooling was employed during the addition to maintain temperature control. After completion of the addition, the mixture was heated on the steam bath for 45 minutes. During the heating, the water of reaction separated in the reaction mixture and distilled therefrom as a benzene-water azeotrope. After completion of the heating, the mixture was cooled in an ice bath to precipitate a white solid. The latter was recovered and purified as described in Example 1 to obtain a 3,3'-(N-benzylimino)diphthalide product melting at 126°–128° C.

*Example 3.—3,3'-(N-normal-dodecylimino)diphthalide*

In a reaction carried out in a manner similar to that described in Example 1, 75.0 grams (0.50 mole) of phthalaldehydic acid was added with cooling to a solution of 46.2 grams (0.25 mole) of normal-dodecylamine in 200 milliliters of benzene. The resulting mixture was heated on the steam bath and the water of reaction which separated during the heating was distilled as a water-benzene azeotrope. Thereafter, the mixture was cooled to precipitate a 3,3'-(N-normal-dodecylimino)diphthalide product which after recovery and purification as previously described melted at 86°–90° C.

*Example 4.—3,3'-(N-(2-bromoethyl)imino)diphthalide*

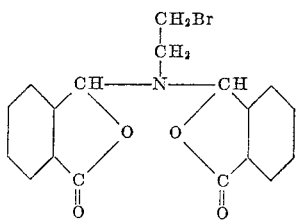

51.2 grams (0.25 mole) of 2-bromoethylamine hydrobromide was dissolved in water and neutralized with 50 milliliters of 5-normal sodium hydroxide. 37.5 grams (0.25 mole) of phthalaldehydic acid was added to the aqueous solution and the mixture gently heated. During the course of the heating, an amber oil precipitated. The latter was extracted from the mixture with 150 milliliters of benzene, and the benzene extract warmed to 30°–40° C. under reduced pressure to distill off benzene and to obtain as residue the desired 3,3'-(N-(2-bromoethyl)imino)diphthalide product as a viscous amber oil in a yield of 49 grams or 100 percent of theoretical. After standing several weeks, the oil solidified to a product melting at 168°–171° C.

*Example 5.—3,3'-(N-normal-octylimino)diphthalide*

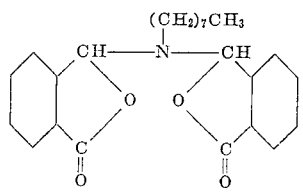

In a preparation carried out in a similar manner, 3,3'-(N-normal-octylimino)diphthalide having a refractive index, $n_D^{20°}$ of 1.528 was obtained by the reaction of phthalaldehydic acid with normal-octylamine.

*Example 6.—3,3'-(N-methylimino)diphthalide*

9.5 grams (0.306 mole) of methylamine was dissolved in 350 milliliters of benzene by passing gaseous methylamine into benzene until a 9.5 gram weight gain was noted. The resulting solution was cooled in an ice bath and 45.0 grams (0.30 mole) of phthalaldehydic acid added thereto. The resulting mixture was heated to 50°–60° C. over a period of 3 hours to produce the 3,3'-(N-methylimino)diphthalide product and water of reaction. The pressure was gradually reduced during the heating period to distill the water-benzene azeotrope and remaining benzene and to obtain as residue the desired phthalide product. The latter was a solid having a melting point of 231°–233° C. The yield of the product was 38 grams or 100 percent of theoretical.

*Example 7.—3,3'-iminodiphthalide*

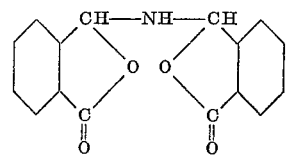

A solution of 45.0 grams (0.5 mole) of phthalaldehydic acid in 150 milliliters of water was neutralized to pH of about 8 by the gradual addition of ammonia. A reaction took place immediately with the formation of the desired product which precipitated from the reaction mixture. The resulting mixture was heated on the steam bath for one hour and then cooled in an ice bath to precipitate further product. The solid was washed with cold water and dried at 60° C. to obtain a product melting at 209°–210° C.

In preparations carried out in a similar manner, the following phthalides are prepared:

3,3'-(N-cyclohexylimino)diphthalide having a molecular weight of 363 by the reaction of two moles of phthalaldehydic acid with one mole of cyclohexylamine.

3,3' - (N - allylimino)diphthalide having a molecular weight of 321 by the reaction of two moles of phthalaldehydic acid with one mole of allylamine.

3,3'-[N-(2-methoxyethyl)imino] diphthalide having a molecular weight of 339 by the reaction of two moles of phthalaldehydic acid with one mole of 2-methoxyethylamine.

3,3'-[N-(3-chloropropyl)imino]diphthalide having a molecular weight of 363 by the reaction of two moles of phthalaldehydic acid with one mole of 3-chloropropylamine.

3,3'-(N-octadecylimino)diphthalide having a molecular weight of 533 by the reaction of two moles of phthalaldehydic acid with one mole of octadecylamine.

3,3'-[N-(2-isopropoxyethyl)imino]diphthalide having a molecular weight of 367 by the reaction of two moles of phthalaldehydic acid with one mole of 2-isopropoxyethylamine.

3,3'-[N - (1-methyl-4-pentenyl)imino]diphthalide having a molecular weight of 363 by the reaction of two moles of phthalaldehydic acid with one mole of 2-amino-hexene-5.

3,3'-[N-(2-phenylethyl)imino]diphthalide having a molecular weight of 385 by the reaction of two moles of phthalaldehydic acid with one mole of β-phenylethylamine.

3,3' - (N - oleylimino)diphthalide having a molecular weight of 531 by the reaction of two moles of phthalaldehydic acid with one mole of oleylamine.

The compounds of this invention have utility as parasiticides in various insecticidal and antimicrobial compositions. The antimicrobial property of the diphthalides is illustrated by an operation wherein solid nutrient agar medium saturated with diphthalides having the structure

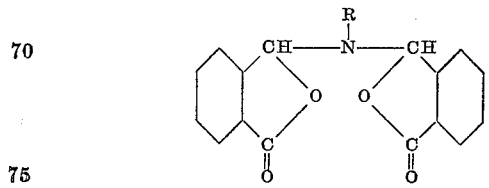

gives complete inhibition of growth when streaked with *Staphylococcus aureus* and incubated at 30° C. for three days.

The phthalaldehydic acid employed in this invention may be prepared by first photochlorinating o-xylene to obtain α,α,α,α',α'-pentachloro-o-xylene by passing chlorine gas into o-xylene while illuminating with sun lamps. The resulting chlorinated o-xylene is then heated with aqueous constant boiling hydrochloric acid and ferric chloride solution, as more fully disclosed in U.S. Patent 2,748,162.

This application is a continuation in part of our copending application Serial No. 595,858, filed July 5, 1956, now abandoned.

We claim:
1. A diphthalide having the formula

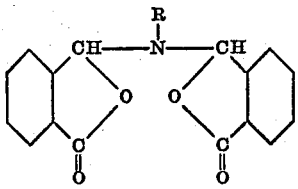

wherein R represents a member of the group consisting of hydrogen, halo-lower-alkyl, lower-alkoxy-lower alkyl, phenyl-lower-alkyl, cycloalkyl containing from 5 to 6 carbon atoms, inclusive, alkyl containing from 1 to 18 carbon atoms, inclusive, and alkenyl containing from 3 to 18 carbon atoms, inclusive.

2. 3,3'-iminodiphthalide.
3. 3,3'-(N-normal-butylimino)diphthalide.
4. 3,3'-(N-benzylimino)diphthalide.
5. 3,3'-(N-normal-dodecylimino)diphthalide.
6. 3,3'-[N-(2-bromoethyl)imino]diphthalide.

No references cited.